United States Patent [19]

Wilkens

[11] 4,048,413
[45] Sept. 13, 1977

[54] HIGH-CONVERSION DRIFT-FREE BATCH-TYPE ADDITION COPOLYMERIZATION

[75] Inventor: James B. Wilkens, Medina, Ohio

[73] Assignee: SCM Corporation, Cleveland, Ohio

[21] Appl. No.: 638,663

[22] Filed: Dec. 8, 1975

[51] Int. Cl.² .............................................. C08F 2/00
[52] U.S. Cl. ...................................... 526/66; 526/65; 526/87
[58] Field of Search .............................. 526/65, 66, 87

[56] References Cited

U.S. PATENT DOCUMENTS

| | | | |
|---|---|---|---|
| 2,420,330 | 5/1947 | Schriver et al. | 526/87 |
| 2,496,384 | 2/1950 | de Nie | 526/87 |
| 2,534,108 | 12/1950 | de Nie et al. | 526/87 |
| 2,559,154 | 7/1951 | Ham | 526/87 |
| 2,641,595 | 6/1953 | Leary | 526/87 |
| 3,080,348 | 3/1963 | Lang et al. | 260/86.7 |
| 3,401,153 | 9/1968 | Zimmerman et al. | 526/87 |
| 3,449,300 | 6/1969 | Slocombe et al. | 526/87 |
| 3,595,826 | 7/1971 | Conard | 526/87 |
| 3,787,187 | 1/1974 | De Witt | 23/285 |

FOREIGN PATENT DOCUMENTS

| | | | |
|---|---|---|---|
| 963,982 | 7/1964 | United Kingdom | 526/87 |

Primary Examiner—Alan Holler

Attorney, Agent, or Firm—Merton H. Douthitt; James B. Wilkens

[57] ABSTRACT

Copolymer substantially free from compositional drift can be produced in a batch-type addition copolymerization process to a high degree of conversion by initiating the reaction in a monomer-containing phase (optionally dispersed in another phase of a reaction mixture) containing the monomers at mole ratios $f_i$ such that the monomers will initially be incorporated into copolymer at the desired mole ratios $F_i$ and sustaining the reaction while simultaneously controlling the addition each monomer to the phase in which the copolymerization reaction is continuing according to the relation $$Q_i = f_i Q_0 + (F_i - f_i Q_0/Q_\infty)Z,$$

where $Q_i$ is the running cumulative moles of monomer $i$ added to the phase in which reaction is occurring (including that initially present), $Q_0$ is the total moles of all monomers initially present in that phase, $Q_\infty$ is the total moles of all monomers ultimately to be added to that phase, and $Z$ is the running cumulative moles of all monomers converted to copolymer. $Q_0/Q_\infty$ must not substantially exceed the smallest ratio $F_i/f_i$ for any of the monomers and in the preferred mode is made substantially equal to that smallest ratio, thereby eliminating the corresponding monomer from the continuing addition.

15 Claims, No Drawings

HIGH-CONVERSION DRIFT-FREE BATCH-TYPE ADDITION COPOLYMERIZATION

When addition copolymerization of a plurality of ethylenically unsaturated monomers is conducted in a batch-type process it has long been known that in general the composition of the copolymer produced will drift as the reaction proceeds, the copolymer produced early in the course of the reaction being relatively richer in the more reactive component monomers and correspondingly leaner in the less reactive component monomers as compared to the copolymer produced toward completion of the copolymerization reaction. The degree of compositional variation between early and late product copolymer will vary depending on the relative reactivities and concentrations of the various reactive species in the reacting mixture. It is not unusual for some highly reactive component monomers to be almost totally absent from a significant proportion of the copolymer produced toward the end of a batch copolymerization reaction. In exceptional cases (sometimes identified as copolymerization azeotropes) where the relative reactivities of the various reacting species have just the right relationships, copolymer will be produced incorporating each monomer in the same molar proportion as its occurrence as unreacted monomer in the reacting mixture and in these rare cases no compositional drift will occur.

In order to avoid the consequences of almost total absence of some of the desired component monomers from a significant proportion of the copolymer produced, a portion of the more reactive monomers can be withheld from the initial charge to the reactor and then metered in gradually as the reaction proceeds, thus ensuring that at least some quantity of those reactive monomers will be available in the reacting mixture for incorporation into the copolymer produced late in the reaction. In practice this technique has usually been adopted only for fairly extreme cases and then only as a crude approximation, the emphasis being on avoidance of the most extreme degrees of nonuniformity of composition of the copolymer produced, but with no expectation that true uniformity of composition would be approached.

An alternative procedure for avoiding some of the compositional drift to which batch copolymerizations are normally susceptible was early recognized. If only a portion of each of the monomers to be copolymerized is initially placed in the reaction mixture, the relative molar proportion of each being selected so that the copolymer initially produced from that reaction mixture will incorporate each monomer in the desired molar proportion, then that condition of the reacting mixture can be maintained so as to continue producing copolymer of the desired composition without compositional drift if further portions of each monomer are added either continuously or at frequent intervals as the reaction proceeds so as to exactly (or at least approximately) replace the amount of each monomer in the reacting mixture which has been converted to copolymer. This procedure has the disadvantage that when the replacement monomer feed is ultimately discontinued, continuation of the copolymerization reaction will suffer the compositional drift of product composition which it was sought to avoid, albeit the effect of the drift in composition of the copolymer produced during the terminal stages of the reaction will be somewhat ameliorated by dilution in the compositionally uniform product produced earlier in the reaction.

If the copolymerization reaction is terminated at the same time the monomer replacement feed is discontinued, no product exhibiting compositional drift will be produced. But then, ordinarily, the product copolymer will have to be separated from the residual unreacted monomers, which is inconvenient at best and, under many circumstances, both difficult and expensive. It is possible to minimize the amount of residual unreacted monomers present at the time monomer replacement feed is discontinued by making the initial charge of monomers to the reactor very small relative to the amount of copolymer to be produced, but this has the concomitant disadvantage of excessively and expensively prolonging the time required to produce a given quantity of product copolymer. Furthermore, the smaller the amounts of unreacted monomers that are to be maintained in the reacting mixture as the copolymerization reaction proceeds, the greater will be the compositional deviations arising from inevitable imperfections in the control of the monomer replacement feed.

The object of the present invention is to provide a method for copolymerizing a plurality of mutually copolymerizable ethylenically unsaturated monomers by a batch-type addition copolymerization process substantially without compositional drift in the copolymer produced while converting as high a proportion of monomers to copolymer as is practically achievable without changing the reaction conditions to such an extent as to significantly alter the relative reactivities of the reacting species.

The generally accepted theory of free-radical copolymerization (and the associated equations describing such reactions) has been known for at least 30 years and is well summarized in Ham, COPOLYMERIZATION (Interscience 1964) pp. 1–65 and especially pp. 30–37, incorporated herein by reference. See also Walling and Briggs, J.Am. Chem. Soc., Vol. 67, pp. 1774–8 (1945), also incorporated herein by reference. If the reactivity ratios are known with acceptable accuracy for each monomer-radical pair under the conditions of the reaction, then the standard and widely known techniques of linear algebra can be employed to calculate from those reactivity ratios and the conventional copolymerization equations the relative molar proportions of each unreacted monomer (which may be appropriately expressed as the mole fraction $f_i$ of each unreacted monomer $i$, based on all of the reactive monomers present but ignoring polymer, solvent, initiator and any other non-monomer species which may also be present) which must be maintained in the phase in which the free-radical copolymerization reaction is occurring in order that the reaction will produce copolymer incorporating each of those monomers in the desired proportion (appropriately expressed as the mole fraction $F_i$ of each monomer incorporated therein). If acceptable reactivity ratio data (or acceptable estimates thereof) are not available or if for any other reason it is desired to avoid this calculation, then the required proportion $f_i$ of each monomer required to be maintained in the phase in which the copolymerization reaction is occurring can be determined by study of the molar incorporation $F_i$ of each monomer in low conversion batch copolymers (wherein the compositional drift effect is substantially eliminated by terminating the copolymerization at a low degree of conversion of monomers to copolymer) produced under similar reaction conditions from various trial mixtures of the same monomers. The required knowledge of the unreacted monomer composition $f_i$ which will produce copolymer incorporating those monomers in the desired proportions $F_i$ may also be available from the study of continuous, as opposed to batch-type, copolymerizations involving the same monomers under similar conditions or from some other source. Obtaining this information, i.e. the required values of the $f_i$, is well within the skill of those knowledgeable in the field of free-radical copolymerization and is not part of the present invention, although it is a necessary preliminary to the use of the method of the present invention.

This same basic copolymerization theory (and associated equations) has also been found generally applicable to ionic (including both anionic and cationic) copolymerizations of ethylenically unsaturated monomers. See Ham, COPOLYMERIZATION (Interscience 1964), pp. 283–334 and especially pp. 290–294 as to cationic copolymerization and pp. 421–35 as to anionic copolymerization, all of these disclosures being incorporated herein by reference. In ionic addition copolymerizations the reactivity ratios refer to monomer-ion pairs rather than to monomer-radical pairs and the values of the reactivity ratios are to a much greater extent than in free-radical copolymerizations dependent on the specific monomers being copolymerized and also on the solvent and other species present in the reacting mixture. For the purposes of the present invention the important features of the addition copolymerization mechanism are (1) that the values of the reactivity ratios of the various radicals or ions be substantially independent of their structure except for the terminal reactive monomer residue, (2) that the reactivity ratios be substantially independent of conversion, and (3) that conventional steady state assumption be at least approximately true, i.e. that chain initiation and chain termination reactions approximately balance each other. Those skilled in the addition copolymerization art will know how to recognize the effects of substantial departures from these important assumptions or limitations of the underlying theory which will tend to impair the success of the present method in achieving its objectives.

However the required values of the $f_i$ are determined, once they are known the monomer composition of the monomer-containing phase in which the copolymerization reaction takes place must conform to those values of the $f_i$ in order that copolymer of the desired composition $F_i$ may be produced therein. In order to substantially prevent drift in the composition of the copolymer being produced from the initially established values $F_i$ following initiation of the copolymerization reaction, a monomer feed stream containing unreacted monomers in appropriate relative proportions must be added to the reaction mixture so as to control the addition of monomers to that monomer-containing phase to substantially conform to the equations $$Q_i = f_i Q_O + (F_i - f_i Q_O / Q_\infty) Z,$$

where $Q_i$ is the running cumulative molar addition of monomer $i$ to said monomer-containing phase (including the portion of $f_i Q_O$ initially present therein), $Q_O$ is the total moles of all monomers initially present therein, $Q_\infty$ is the total moles of all monomers ultimately to be added thereto, and $Z$ is the running cumulative total moles of all monomers converted in said monomer-containing phase to copolymer. The monomer mole ratios in the addition to the monomer-containing phase wherein the copolymerization reaction is being sustained do not vary as the reaction proceeds and have the values $$q_i = \frac{F_i - f_i Q_O / Q_\infty}{1 - Q_O / Q_\infty},$$

where $q_i$ is the mole fraction of monomer $i$ in that addition based on monomers only, i.e. ignoring any that diluent, catalyst, or other non-monomer species. The total running cumulative molar addition $Q$ to the monomer-containing phase is given by $$Q = \Sigma_i Q_i = Q_O + (1 - Q_O / Q_\infty) Z.$$

When this schedule of monomer addition to the monomer-containing phase in which the copolymerization reaction is taking place is followed, the amounts of unreacted monomers present in that phase will gradually decrease from their initial values ($f_i Q_O$) toward O as completion of the reaction is approached, but the mole ratios of the unreacted monomers therein present will continue to have the required values $f_i$.

It will be observed that the total molar amount of all monomers included in the initial reaction mixture (as a proportion of the total molar amount of all monomers ultimately to be added, i.e. $Q_O / Q_\infty$) should not significantly exceed the smallest of the ratios $F_i / f_i$ for any of the monomers $i$, since otherwise the corresponding addition of that monomer would be required to be negative. This would correspond to removal rather than addition of that monomer to the reacting mixture and might be desirable in some circumstances, such as extreme variations in the reactivity ratios among the various monomer-radical or monomer-ion pairs, but ordinarily would be awkward to control and unnecessary. In the preferred mode, the total moles of all monomers initially in the monomer-containing phase ($Q_O$) is chosen to give $Q_O / Q_\infty = F_m / f_m$, where $m$ indicates that monomer having the smallest ratio $F_i / f_i$. This gives the initial reaction mixture (heel) its maximum size without requiring removal of any monomer during subsequent reaction and also gives $q_m = O$, which means that monomer $m$ need not be present at all in the monomer feed stream. This is particularly convenient in binary copolymerizations where the monomer addition will then involve only a single monomer species.

Addition copolymerization of ethylenically unsaturated monomers may be conducted in bulk, i.e. without any substantial proportion of non-reactive solvent or dispersion medium being present. Such polymerizations may also be conducted in solution in a nonreactive solvent medium. In either of these cases the method of the present invention can be directly applied, the choice of reaction conditions, initiator systems, solvents (if any), etc. being largely unaffected and subject to the usual considerations well-known to those skilled in the copolymerization art. In ether bulk or solution copolymerizations, the product copolymer may in some cases become insoluble in the reaction medium when it reaches a certain molecular weight and/or concentration. So long as any precipitation of product copolymer takes place into a separate phase substantially free of reacting monomer, no fundamental modification in the method of the present invention is required. It is, of course, a constant requirement of the method that techniques suitable to the actual circumstances be adopted for determining the course of conversion of monomers to copolymer in order to guide the rate of addition of the monomer feed stream. On the other hand, if a precipitated product copolymer phase also contains a significant proportion of any of the unreacted monomers, then the composition of the monomer feed stream and/or its rate of addition will require appropriate modification in light of the distribution of unreacted monomers between the two phases in order to maintain the mole fractions $f_i$ constant in the original phase in which the copolymerization reaction is continuing. If the copolymerization reaction is found to propagate also in the precipitate phase to any significant extent, it will be difficult if not impossible to control the mole fractions of unreacted monomers present in both phases at the required values of $f_i$ so as to continue producing drift-free copolymer of the same composition $F_i$ in both phases.

Addition copolymerizations can also be undertaken by suspension (bead) and emulsion copolymerization processes in which the polymerization reaction takes place in a monomer-containing phase which is subdivided and dispersed in a fluid dispersion medium (usually aqueous) in which both the unreacted monomers and the product copolymer are substantially insoluble. The two types of process differ in that in suspension copolymerizations the copolymerization reaction is thought to be initiated and continued in the phase into which the monomers are initially dispersed, whereas in emulsion copolymerizations the copolymerization reaction is thought to occur predominantly if not exclusively in a second dispersed phase containing the product copolymer and only formed after the copolymerization reaction has been initiated, probably in the dispersing (aqueous) phase. Most of the unreacted monomer present at any given time in the overall reaction mixture in an emulsion copolymerization process is thought to be present in the non-reacting dispersed monomer phase (monomer droplets) from whence it must diffuse through the (aqueous) dispersion medium into the dispersed polymer-containing phase in which the copolymerization reaction is thought to be largely occurring before it is available for participation in that reaction.

It will be seen that the required control of the molar ratios of unreacted monomers ($f_i$) in suspension copolymerization processes will be direct and straightforward, since the monomers will be present to significant extent in only a single, albeit subdivided and dispersed, phase in which the copolymerization reaction is also occurring and therefore the required monomer additions to this phase can be merely added to the overall reaction mixture with the expectation that with a moderate and ordinary degree of agitation thereof the monomers so added will be substantially and promptly absorbed into the dispersed reacting phase. In some cases it will be found necessary to restrict the amount of suspension stabilizer present and/or to add the monomer feed stream to the overall reaction mixture in the form of emulsified monomer-containing droplets in order that the transfer of monomer into the suspended particles in which copolymerization is occurring may be effected with sufficient promptness and completeness to ensure that the mole ratios of unreacted monomers in that phase are directly responsive to the monomer feed stream. See U.S. Pat. No. 3,792,029, Roubinek and Kressman, incorporated herein by reference. In contrast, in emulsion copolymerizations monomers added to the overall reaction mixture as copolymerization proceeds will, at least in part, be absorbed into the non-reacting monomer droplets. Where sufficient information is available concerning the distributions of monomers between the monomer droplets and the reacting polymer particles and the rates of transfer of unreacted monomers between these two dispersed phases by diffusion through the dispersion medium, it will be possible to directly control the addition of monomers to the overall reaction mixture in such a way that the rate of transfer of monomers into the reacting polymer particles is indirectly controlled according to the requirements of the present method.

It is well-known that the distributions of molecular weight, branching, head-to-head as opposed to head-to-tail addition, etc. of the product copolymer as well as the actual rates of reaction will vary with the conditions of temperature, pressure, solvent (if any), chain transfer agent (if any), mechanism (e.g. free-radical, anionic, cationic), surfactant (if any), etc. under which the reaction is conducted. The selection and control of these and other relevant factors is outside the scope of the present invention, although obviously important to the overall goal of producing any particular copolymer product. While it would be inaccurate to suggest that all of the factors which influence the production of copolymers and the properties of the copolymers produced are thoroughly understood, those skilled in the addition copolymerization art do have a great deal of valuable and useful knowledge about such factors and their effects and the present invention adds nothing to that body of skill and knowledge other than a convenient method for controlling compositional drift. The successful exploitation of this method clearly depends on the simultaneous application of the skill and knowledge as to other factors and effects available in the art.

It is to be emphasized that it is the actual molar ratios of unreacted monomers ($f_i$) available to coreact to give copolymer of the desired composition ($F_i$) which must be maintained in the phase in which the copolymerization reaction is occurring in order to prevent drift in the composition of the copolymer being produced. The method of the present invention depends on the reactivity ratios (which determine the $f_i$ values) remaining substantially unchanged as the copolymerization reaction proceeds. This will usually be found to be true so long as the reaction conditions are maintained substantially constant. The further assumption usually made in discussing free-radical copolymerizations that the reactivity ratios for any monomer-radical pair are substantially independent of the presene of other monomers and radicals is not a limitation of the present method. While it will often be convenient in free-radical copolymerizations to utilize reactivity ratios determined from copolymerization reactions involving less than all of the monomers to be incorporated in the product copolymer as a basis for calculating estimates of the $f_i$ required to produce a desired copolymer composition $F_i$, such calculated values should be regarded as mere estimates until confirmed directly by actual compositional analysis of the copolymer produced therefrom or more indirectly by confirming that the copolymer produced by employing the estimated values so calculated in the method of the present invention exhibits the desirable properties associated with copolymers of like composition produced uner similar conditions known to give drift-free copolymer product composition. If such analysis or testing fails to confirm that the estimated reactivity ratios adequately represent the actual relative reactivities, then new values for the $f_i$ should be tried, guided by whatever reliable information is available until a satisfactory set of values for the $f_i$ is determind. To reiterate, the method of the present invention assumes prior reliable knowledge of the values of the $f_i$ required to produce copolymer of the desired composition ($F_j$) and the acquisition of that knowledge is not a part of the method of the present invention.

It is necessary, in order to practice the method of the present invention to determine the course of conversion of monomers to copolymer so that the monomer addition may be controlled substantially in accordance with the required proportionality of that addition to conversion, i.e. $dQ/dZ = 1 - Q_0/Q_\infty$. For any given composition and reaction conditions it will usually be acceptable in commercial production to establish this course of conversion once for any particular composition and reaction conditions and in subsequent repetitions of the method for that (or similar) composition and conditions to rely upon this previous history to guide the rate of addition of the monomer feed stream. It will usually be clear to one skilled in the copolymerization art how to make appropriate modifications and corrections in the practice of the method here disclosed in order to take account of relatively small alterations. in composition and/or conditions from those for which a reliable history of the course of conversion to copolymer is known, whether those alterations are intentional or inadvertant.

When actual measurement of the course of conversion of monomers to copolymers is to be made, a number of techniques are available. Those skilled in the copolymerization art will recognize which technique are suitable and convenient in particular circumstances. One such technique comprises measuring the viscosity of the reaction mixture, either in situ or by intermittently withdrawing a small sample thereof for the purpose which may be diluted with solvent or subjected to other appropriate preliminary treatments before making the viscosity measurement itself. Another technique involves intermittently withdrawing a small sample of the reaction mixture and determining the proportion of copolymer therein by rapidly volatilizing unreacted monomers, solvents, and other volatilizable components, appropriate account being taken of any non-volatilizable components other than copolymer which may be present. A third technique is to measure the heat liberated as the reaction proceeds by conventional calorimetric techniques. Or conversion may be measured by techniques sensitive to density, such as direct weight-per-unit-volume measurements or indirectly by gamma ray absorption, etc. Optical measurements of either the absorption or scattering of light of appropriate wavelengths may also be adapted to this purpose. Numerous other techniques adaptable for determining the extent of conversion of monomers to copolymers in conjunction with the method of the present invention will be known to those skilled in the copolymerization art. These techniques may involve preliminary separations or other treatments before the indicated measurements are made.

The advantages of using the method of the present invention lie in being able to produce a broad range of copolymer products at reasonable rates by simple batch-type addition copolymerization processes from a plurality of copolymerizable ethylenically unsaturated monomers and substantially free from compositional drift, while simultaneously realizing a high degree of conversion of monomers to copolymer. Among the advantageous properties of such products, as compared to copolymers of similar average composition prepared under similar reactions conditions but without substantial prevention of compositional drift, are the more uniform solubility characteristics of all portions of the product copolymer whether produced early or late in the copolymerization reaction. This is of particular importance where specific solubilizing or dispersing effects, such as ionization, are associated with specific monomers, such as acids or amines, incorporated in the copolymer. Other copolymer properties which may depend upon uniformity of composition of all portions of the copolymer include crystallizability (or non-crystallizabilty), adhesion to various substates, mutual solubility of various portions of the copolymer in itself, electrophoretic characteristics, and many others.

The method of the present invention is applicable, subject to the conditions and limitations outlined hereinabove, to virtually any mixture of ethylenically unsaturated monomers mutually copolymerizable by an addition copolymerizable process. The chemistry of such copolymerization reaction is a highly developed art and a vast range of such copolymerizable mixtures is known or will be obvious to those skilled in the copolymerization art, many being the subject of large commercial production. Representative of ethylenically unsaturated monomers which have been widely studied and/or commercially used in addition copolymerization reactions and to mixtures of which the method of the present invention is applicable are ethylene, propylene, isobutylene, butadiene, styrene, vinyl toluene, vinyl chloride, vinyl acetate, vinyl butyrate, acrylic and methacrylic acids and the methyl, ethyl, hydroxyethyl, butyl and 2-ethylhexyl esters thereof, acrylonitrile, maleic acid and anhydride, and many, many others.

The method of the present invention will be applicable, with appropriate modifications obvious to those skilled in the addition copolymerization art, to copolymerization reactions wherein it is desired to graft copolymer chains of uniform, i.e. drift-free, composition onto previously formed polymer or copolymer chains and to copolymerization reactions wherein it is desired to form successive copolymer blocks within each copolymer chain, each such block comprising a particular drift-free copolymer composition. In a grafting reaction it will merely be necessary to have present in the reacting mixture a suitable substrate polymer or copolymer to which grafting can occur and, if desirable, a suitable chain transfer agent. A process for making a block copolymer from drift-free copolymer blocks will comprise merely a series of successive applications of the present method with suitable precautions to ensure that successive blocks attach together to form chains rather than merely a mixture of separate copolymer molecules.

The basic idea of the present method, i.e. the recognition that only the mole ratios and not the amounts of concentrations of the reactant monomers must be held constant in the reacting mixture in order to prevent compositional drift in the product copolymer, can be adapted to processes in which the rate of addition of the monomer feed stream (and correspondingly the rate of decline of the residual amounts of unreacted monomers present in the reacting mixture) is not directly proportional to the rate of conversion of monomers to copolymer according to the relationship given hereinabove, i.e. $dQ/dZ = 1 - Q_oQ_\infty$. Thus the inventory of unreacted monomers present in the reacting mixture could be maintained at or near its original amount so as to keep the overall rate of reaction high. But any substantial departure from the addition rate of the present method would necessitate changing the composition of the momoner feed stream as conversion progressed if compositional drift in the product were to be avoided to any degree of conversion greater that $1-Q_0/Q_\infty$.

Batch-type copolymerizations are ordinarily performed in conventional reactor vessels equipped to control the temperature and pressure, to provide for agitation and maintaining a supernatant inert atmosphere if that is desired, and to provide for the addition of monomers, solvent, catalysts, etc. However, a continuous copolymerization process in which successive portions of reaction mixture move continuously through a reactor without significant intermixing between such successive portions is also conveniently and properly thought of as a series of arbitrarily small successive batch-type copolymerizations. An intermediate type of process in which the reaction mixture is moved intermittently from one to another of a succession of reactor vessels with mixing within each reactor vessel but without significant intermixing between the reaction mixture contents of any reactor vessel and the reaction mixture contents which preceded or followed it in that reactor vessel, is also conveniently and properly considered as a batch-type copolymerizations. The method of the present invention can be readily adapted to either of these more generalized versions of batch-type copolymerization processes, it merely being required that provisions be made to distribute the required monomer feed stream along the trajectory of each portion of the reaction mixture through the reactor vessel or series of reactor vessels. Where a series of successive reactor vessels are employed, provision can be made for adding the monomer feed stream as required to each such vessel. Where a single continuous reactor without back or forward intermixing is employed, it will ordinarily be sufficient to provide for input of the monomer feed stream at intervals along the path of the reaction mixture through the reactor, so long as these intervals are sufficiently short that only minimal compositional drift occurs between succeeding additions of the monomer feed stream.

In whatever type of reactor the batch-type copolymerization process is carried out, the monomer feed stream may comprise a preformed mixture of all the required monomers in the required proportions or the monomer feed stream may comprise a number of substreams each containing only a single monomer or a mixture of less than all the monomers required to be added. The present invention deals with controlling the rate of addition of reactive monomers to the phase of the reaction mixture in which the copolymerization reaction is proceeding and it is a matter only of practical convenience whether those monomers are added to the reaction mixture as a preformed mixture or separately. Of course, the fact that the mole ratios of monomers to be added to the reacting phase does not change as the copolymerization reaction progresses makes it particularly convenient to add them as a preformed mixture.

I claim:

1. A non-azeotropic batch-type addition copolymerization process for producing copolymer of substantially uniform composition from a plurality of mutually copolymerizable ethylenically unsaturated monomers, each of said monomers designated herein by a different value of the index i other than 0 or $\infty$, said process comprising a. forming a reaction mixture comprising a monomer-containing phase in which said monomers are present in substantially those mole ratios $f_i$ of the moles of each of said monomers to the moles of all of said monomers required to initially produce copolymer in which said monomers are incorporated in substantially the desired mole ratios $F_i$ of the moles of each of said monomers incorporated to the moles of all said monomers incorporated, the moles $Q_0$ of all of said monomers initially present in said monomer-containing phase not substantially exceeding that value which would make the ratio $Q_0/Q_\infty$ equal to the smallest of the ratios $F_i/f_i$ for any of said monomers, where $Q_\infty$ is the total moles of all of said monomers to be copolymerized;

b. initiating an addition copolymerization reaction of said monomers in said monomer-containing phase; and c. sustaining said reaction in said monomer-containing phase under substantially constant conditions, while simultaneously introducing into said reaction mixture a monomer feedstream which controls the cumulative molar addition of each of said monomers to said monomer-containing phase to have substantially the values given by $$Q_i = f_iQ_0 + (F_i - f_iQ_0/Q_\infty)Z$$

when the cumulative moles of all of said monomers converted in said monomer-containing phase to said copolymer is Z, at least until the total unreacted moles of all of said monomers present in said monomer-containing phase is reduced to about $Q_0/2$.

2. The process of claim 1 wherein said addition copolymerization reaction is a free-radical reaction.

3. The process of claim 1 wherein said addition copolymerization reaction is an ionic reaction.

4. The process of claim 1 wherein said monomer-containing phase is a continuous phase.

5. The process of claim 1 wherein said monomer-containing phase is dispersed in another phase in which said monomers are substantially insoluble.

6. The process of claim 5 wherein said other phase is an aqueous phase.

7. The process of claim 1 wherein said reaction mixture contains no added polymer or copolymer.

8. The process of claim 1 wherein said monomer-containing phase contains or is in intimate contact with an added polymer or copolymer and a substantial proportion of the copolymer produced in said process is chemically bonded to said added polymer or copolymer during said process.

9. The process of claim 1 wherein said monomer feedstream is added to said reaction mixture substantially according to the schedule defined by said $Q_i$ and substantially all of the monomers added to said reaction mixture as part of said monomer feedstream are either directly added to said monomer-containing phase or promptly transferred to said monomer-containing phase from any other phase of said reaction mixture to which any portion of said monomer feedstream may have been directly added.

10. The process of claim 9 wherein said ratio $Q_0/Q_\infty$ is substantially equal to the smallest of said ratios $F_i/f_i$.

11. The process of claim 1 wherein said process is a continuous or semi-continuous batch-type process in which, after said addition copolymerization reaction is initiated, said reaction mixture moves a. continuously or intermittently through a single reactor vessel or b. semi-continuously through a series of reactor vessels by intermittent transfer of substantially all of said reaction mixture fro one to another of said series of reactor vessels;

said monomer feedstream is added to said reaction mixture at suitable physically spaced intervals during the progress of said reaction mixture through said reactor vessel or vessels; and said reaction mixture is immediately preceded and/or followed through said reactor vessel or vessels or a substantially identical reaction mixture in a substantially identical process without substantial intermixing between such successive reaction mixtures.

12. The process of claim 1 wherein, after initiation of said addition copolymerization reaction, said reaction mixture remains in the reactor vessel in which said initiation took place until said process is completed.

13. The process of claim 1 wherein said ratio $Q_0/Q_\infty$ is substantially equal to the smallest of said ratios $F_i/f_i$.

14. The process of claim 13 wherein said plurality of monomers consists of only two monomers.

15. The process of claim 1 wherein said plurality of monomers comprises more than two monomers.

* * * * *

UNITED STATES PATENT AND TRADEMARK OFFICE
CERTIFICATE OF CORRECTION

PATENT NO. : 4,048,413
DATED : Sept. 13, 1977
INVENTOR(S) : James B. Wilkens

It is certified that error appears in the above-identified patent and that said Letters Patent are hereby corrected as shown below:

Col. 8, l. 21      "copolymerizable" should read --copolymerization--.

Col. 10, l. 27      In the equation, "$Q_{28}$" should read --$Q_{\infty}$--.

Signed and Sealed this

Third Day of January 1978

[SEAL]

Attest:

RUTH C. MASON      LUTRELLE F. PARKER
Attesting Officer      Acting Commissioner of Patents and Trademarks